(12) United States Patent
Jia et al.

(10) Patent No.: US 8,842,292 B2
(45) Date of Patent: Sep. 23, 2014

(54) APPARATUS AND METHOD FOR DETECTING OPTICAL PROFILE

(75) Inventors: Xin Jia, Chengdu (CN); Tingwen Xing, Chengdu (CN)

(73) Assignee: Institute of Optics and Electronics, Chinese Academy of Sciences, Chengdu (CN)

( * ) Notice: Subject to any disclaimer, the term of this patent is extended or adjusted under 35 U.S.C. 154(b) by 397 days.

(21) Appl. No.: 13/214,645

(22) Filed: Aug. 22, 2011

(65) Prior Publication Data
US 2012/0050749 A1    Mar. 1, 2012

(30) Foreign Application Priority Data
Aug. 24, 2010  (CN) .......................... 2010 1 0266732

(51) Int. Cl.
| | | |
|---|---|---|
| *G01B 11/02* | (2006.01) | |
| *G01B 11/30* | (2006.01) | |
| *G01B 11/24* | (2006.01) | |
| *G01B 9/02* | (2006.01) | |

(52) U.S. Cl.
CPC .......... *G01B 11/2441* (2013.01); *G01B 11/306* (2013.01); *G01B 9/02057* (2013.01); *G01B 9/02083* (2013.01)
USPC ........... 356/511; 356/512; 356/513; 356/514; 356/515

(58) Field of Classification Search
None
See application file for complete search history.

(56) References Cited

U.S. PATENT DOCUMENTS

| | | | |
|---|---|---|---|
| 4,969,744 A * | 11/1990 | Ordell | ........................ 356/510 |
| 5,502,566 A | 3/1996 | Ai et al. | |
| 2005/0087699 A1* | 4/2005 | Miyake | ..................... 250/492.1 |
| 2005/0134862 A1* | 6/2005 | Hill | ............................. 356/500 |

OTHER PUBLICATIONS

Schulz, G. and J. Schwider, Precise Measurement of Planeness, Applied Optics, vol. 6, No. 6, pp. 1077-1084, Jun. 1967.
Schulz, G., Absolute flatness testing by an extended rotation method using two angles of rotation, Applied Optics, vol. 32, No. 7, pp. 1055-1059, Mar. 1993.
Schulz, G. and J. Grzanna, Absolute flatness testing by the rotation method with optimal measuring-error compensation, Applied Optics, vol. 31, No. 19, pp. 3767-3780, Jul. 1992.
Ai, C. and J.C. Wyant, Absolute testing of flats by using even and odd functions, Applied Optics, vol. 32, No. 25, pp. 4698-4705, Sep. 1993.
Chinese Patent No. 101949690, issued Aug. 22, 2012, 29 pages.
Allowed claims (clean version) in Chinese Patent No. 101949690, issued Aug. 22, 2012, 11 pages.

(Continued)

*Primary Examiner* — Tarifur Chowdhury
*Assistant Examiner* — Hina F Ayub
(74) *Attorney, Agent, or Firm* — Osha Liang LLP

(57) ABSTRACT

Apparatus and methods for detecting optical profile are disclosed herein. In one embodiment, an apparatus includes a laser, a beam splitter, a collimation optical unit, first and second holders respectively holding a first test flat mirror and a second test flat mirror, a phase shifter connected with the first holder, and an angular measurement unit for measuring an angular error of the first test flat mirror and the second test flat mirror on the two holders. The first test flat mirror has a first test flat and the second test flat mirror has a second test flat. The apparatus further includes a planar imaging unit for generating the interfered test light having a direction generally along an x-axis direction of the first test flat and an x-axis direction of the second test flat and a convergence optical unit for projecting the interfered test light onto a detector.

4 Claims, 10 Drawing Sheets

(56) References Cited

OTHER PUBLICATIONS

Allowed claims (marked version) in Chinese Patent No. 101949690, issued Aug. 22, 2012, 12 pages.
Office Action issued Nov. 30, 2011 in Chinese Patent Application No. 201010266732.7, 9 pages.
Office Action (original) issued Jul. 13, 2011 in Chinese Patent Application No. 201010266732.7.
Office Action (translation) issued Jul. 13, 2011 in Chinese Patent Application No. 201010266732.7.

\* cited by examiner

APPARATUS AND METHOD FOR DETECTING OPTICAL PROFILE

CROSS-REFERENCE TO RELATED APPLICATION(S)

This application claims priority to Chinese Application No. 201010266732.7, filed on Aug. 24, 2010, the disclosure of which is incorporated herein by reference in its entirety.

TECHNICAL FIELD

The present disclosure relates generally to apparatus and methods for optical profile detection.

BACKGROUND

High accuracy interferometers have been widely used for surface measurement not only in optical manufacturing but also in new fields such as optical disk surface measurement and semiconductor crystal plane measurement. More and more emphasis has been placed on detection accuracy of peak-to-valley ("PV") values in the sub-nanometer range. FIG. 8 schematically shows a system configured according to a conventional six-step absolute flatness detection technique. As shown in FIG. 8, the system comprises a laser light source 1a, a collimation optical system 3a and 4a, a beam splitter 2a, a front surface 5a of a first test flat, a piezoelectric transducer ("PZT") phase shifter 6, a front surface 7a of a second test flat, a convergence optical system 8a, a charge-coupled device ("CCD") 9a, and a computer 10a.

FIG. 9 schematically shows a measurement process of the system in FIG. 8. The measuring process includes:
(1) measuring an optical path difference between the front surface of the first test flat and the front surface of the second test flat;
(2) rotating the first test flat by 180° from its original position, and measuring an optical path difference between the front surface of the first test flat and the front surface of the second test flat;
(3) rotating the first test flat by 90° from its original position, and measuring an optical path difference between the front surface of the first test flat and the front surface of the second test flat;
(4) rotating the first test flat by 45° from its original position, and measuring an optical path difference between the front surface of the first test flat and the front surface of the second test flat;
(5) replacing the second test flat with a third test flat, and measuring an optical path difference between the front surface of the first test flat and the front surface of the third test flat;
(6) replacing the first test flat with the second test flat, and measuring an optical path difference between the front surface of the second test flat and the front surface of the third test flat.

The first test flat, the second test flat, and the third test flat are calculated based on the measurement results. The foregoing six-dimensional angular rotation platform typically has an accuracy of about 10 micro-radians to about 1 milli-radian. Such accuracy levels may not satisfy the ever increasing accuracy requirements in today's industry. Accordingly, there is a need for apparatus and methods that can improve the measurement accuracies of conventional surface measurement platforms.

DETAILED DESCRIPTION

Various embodiments of systems, apparatus, and associated methods for optical profile detection are described below. A person skilled in the relevant art will also understand that the technology may have additional embodiments, and that the technology may be practiced without several of the details of the embodiments described below with reference to FIGS. 1-7 and 10a-12c.

Figure 1:
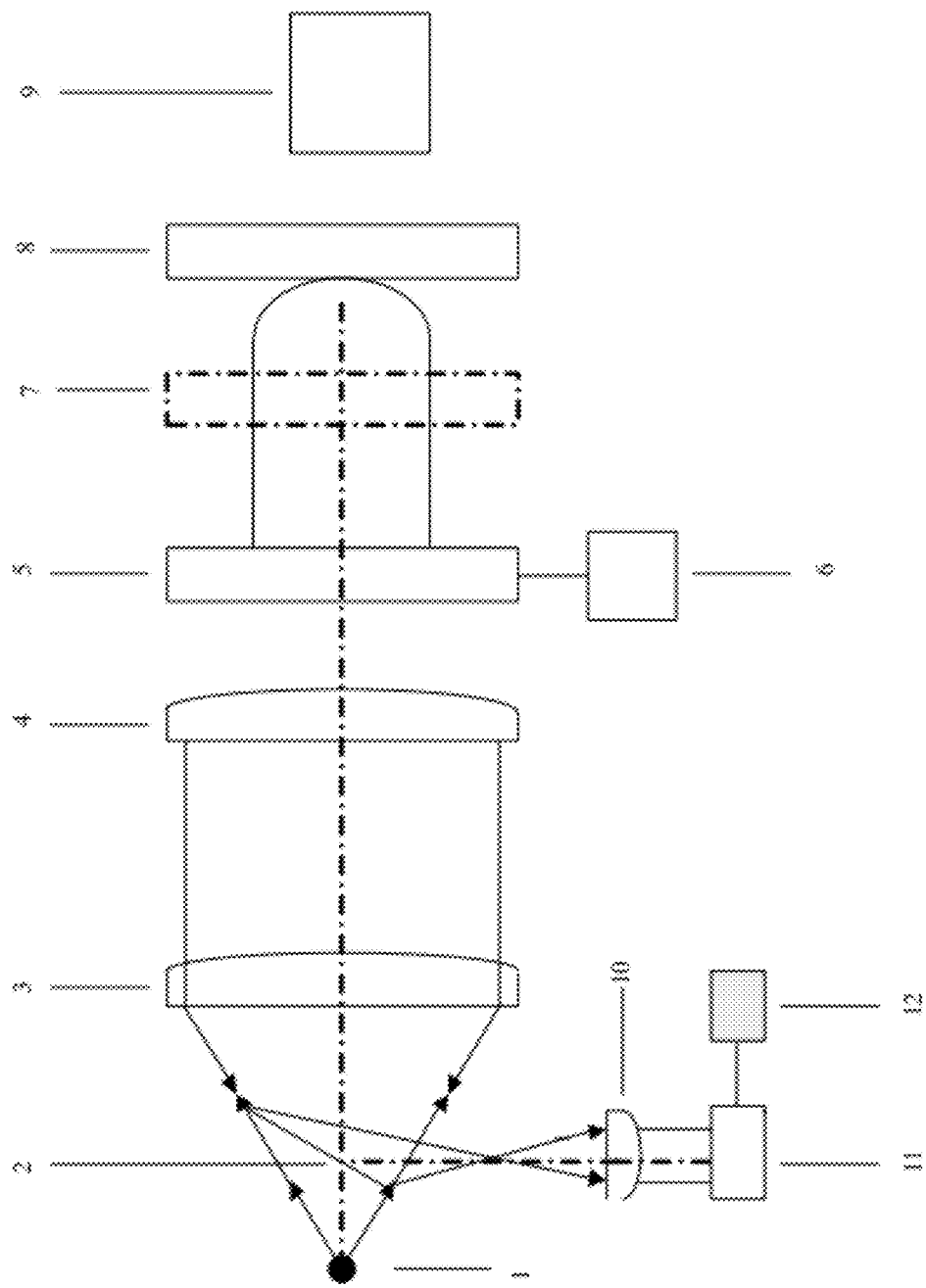
FIG. 1 is a schematic diagram of an apparatus for optical profile detection according to embodiments of the present technology.

FIG. 1 is a schematic diagram of an apparatus for optical profile detection according to embodiments of the present technology. As shown in FIG. 1, the apparatus includes a laser 1, a beam splitter 2, a collimation optical unit 3 and 4, a first holder 5, a phase shifter 6, a planar imaging unit 7, a second holder 8, an angular measurement unit 9, a convergence optical unit 10, a CCD detector 11, and a computer 12 operatively coupled to one another.

The laser 1 is configured as a light source to emit a laser beam. The collimation optical unit 3 and 4 is configured to collimate the laser beam emitted by the laser 1, and thus forming a generally uniform illuminated area. The beam splitter (or splitter) 2 is configured to transmit the laser beam emitted by the laser 1 as an illuminating light and a reflecting interfered test light to a test flat on the holder 5. The phase shifter 6 is controlled by the computer 12 and is configured to shift a phase of lights passing through the test flat. The convergence optical unit 10 is configured to project the interfered test light onto the CCD detector 11.

Figure 7:
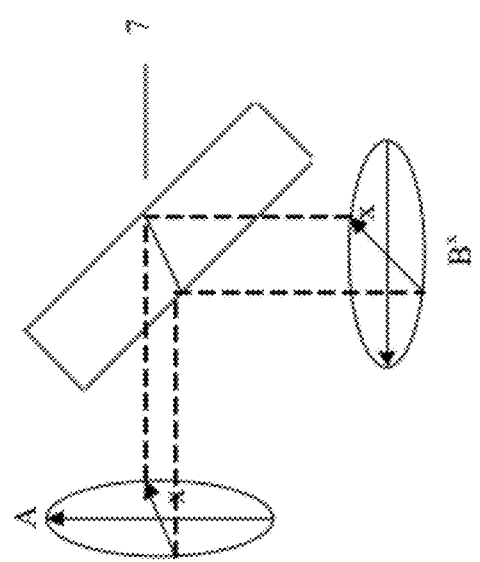
FIG. 7 schematically shows interference between a first test flat and a second test flat when having a consistent x-axis direction with an added planar imaging unit.
Figure 9:
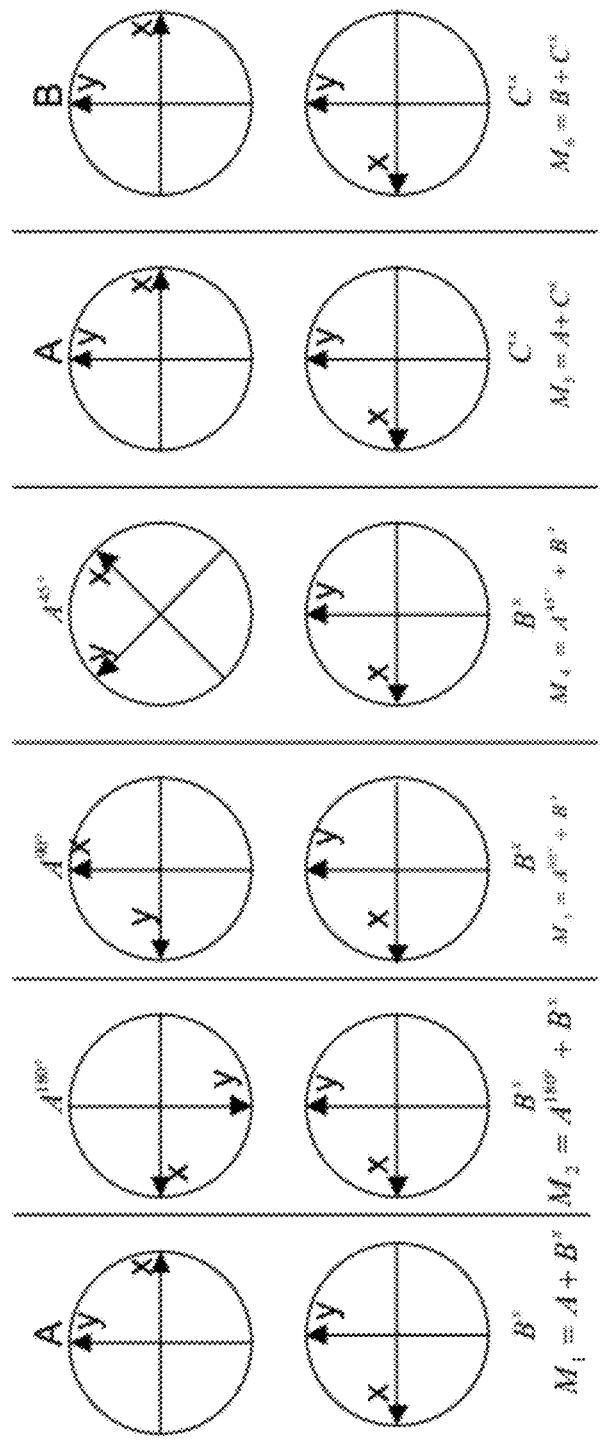
FIG. 9 schematically shows a measurement process of the conventional six-step absolute measurement technique.

The angular measurement unit 9 is configured to measure an angular error of a lens on the first holder 5 and a lens on the second holder 8. The planar imaging unit 7 is configured to generate the interfered test light along the x-axis of the first test flat and the x-axis of the second test flat. FIG. 7 schematically shows the interference between the first test flat and the second test flat when their x-axes are aligned with an added planar imaging unit.

Figure 2:
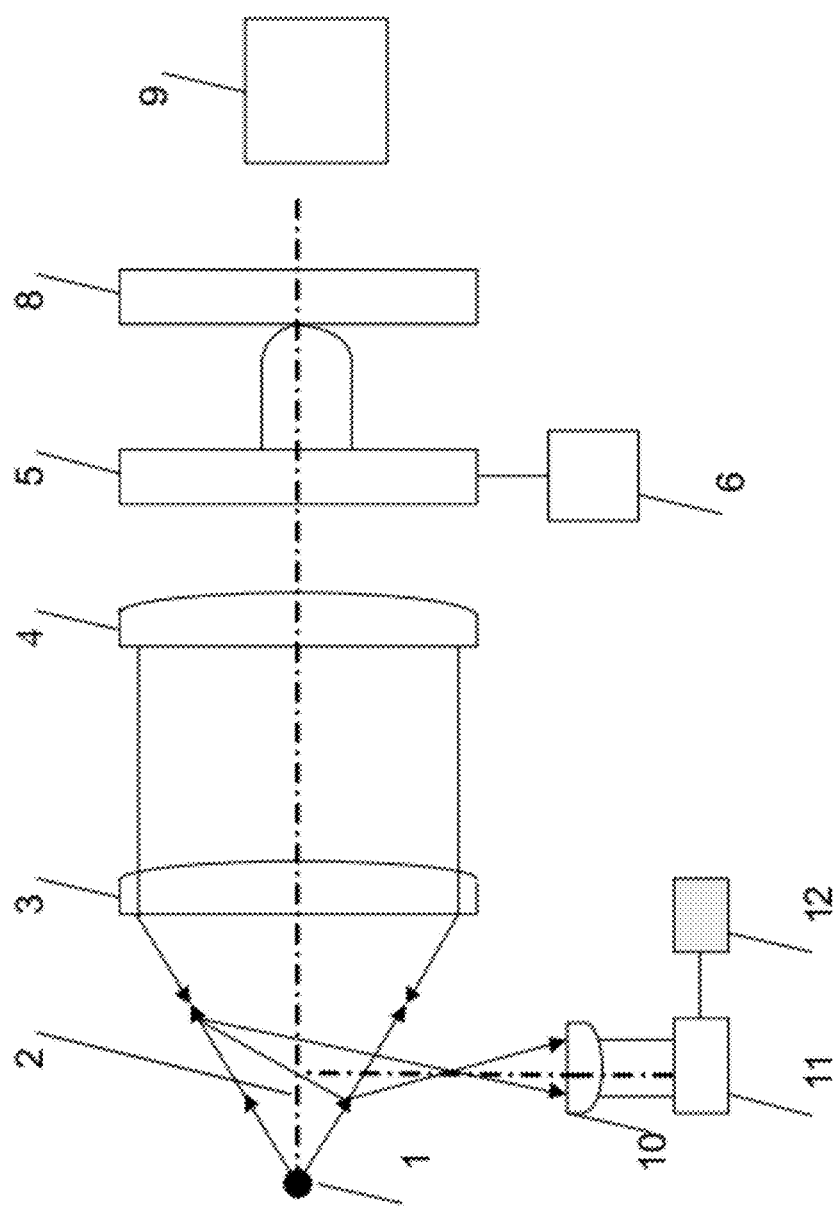
FIG. 2 is a schematic diagram of an apparatus not containing a planar imaging unit according to embodiments of the present technology.

FIG. 2 shows the apparatus in FIG. 1 with the planar imaging unit 7 removed during a measuring process according to embodiments of the present technology. In one embodiment, the computer 12 can controllably remove the planar imaging unit 7 from between the two holders 5 and 8. The laser 1 emits a laser beam that passes through the beam splitter 2 and the collimation optical unit 3 and 4 to produce the illuminating light.

The computer 12 also controls the phase shifter 6 to shift phase. The angular measurement unit 9 is configured to measure an angular error of the test flat on the first holder 5 and the test flat on the second holder 8. The laser 1 is placed on a front focus of the beam splitter 2 and the collimation optical unit 3 and 4. The light passing through the collimation optical unit 3 and 4 is approximately parallel. The test flat on the first holder 5 is placed behind the collimation optical unit 3 and 4, and has its center of optical axis generally aligned with the center of the collimation optical unit and the center of the beam splitter 2. The test flat on the second holder 8 is placed behind and parallel to the lens on the first holder 5. The phase shifter 6 is connected with the first holder 5 for controlling phase shift of the test flat on the first holder 5.

Interference occurs between the test flat on the first holder 5 and the test flat on the second holder 8. The interfered light returns along an optical path passing through the beam splitter 2 and converges by the convergence optical unit 10 to the CCD detector 11. The CCD detector 11 receives the interfered light and provides information of the interfered light to the computer 12, which in turn calculates an optical path difference based on the received information.

The computer 12 can also controllably insert the planar imaging unit 7 between the two holders 5 and 8. The face of the planar imaging unit 7 can be generally parallel to the first test flat and the second test flat. The phase shifter 6 is connected with the first holder 5 and is adapted for controlling the phase shift of the first test flat on the first holder 5.

Figure 3:
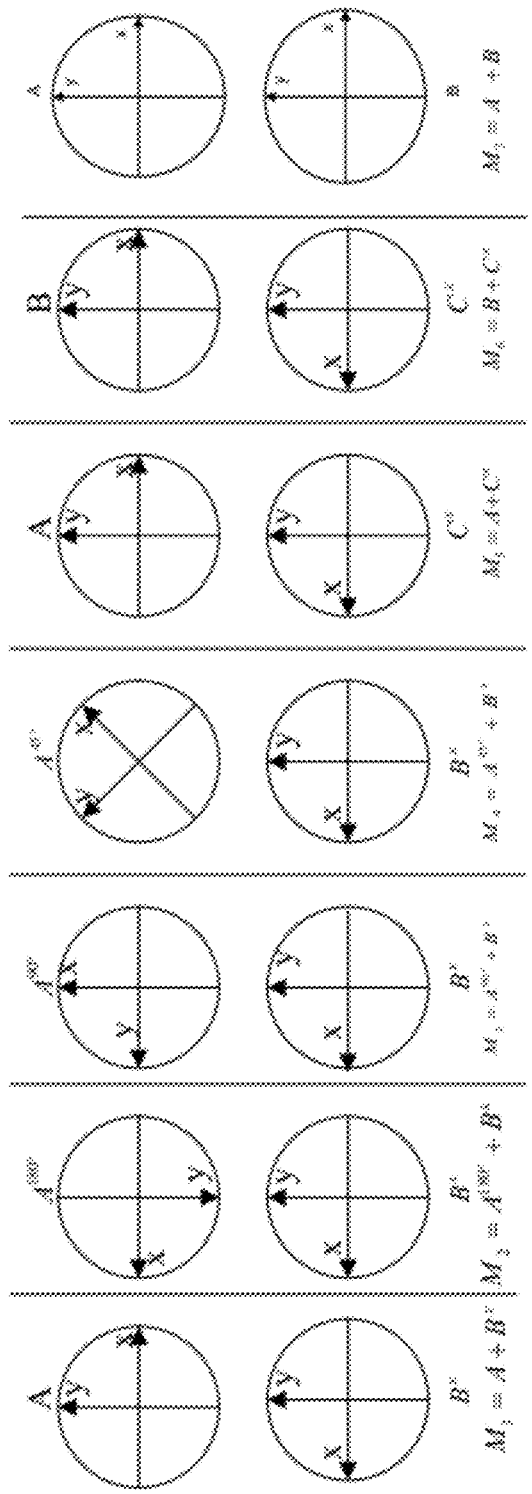
FIG. 3 schematically shows a process for detecting an optical profile according to embodiments of the present technology.
Figure 4:
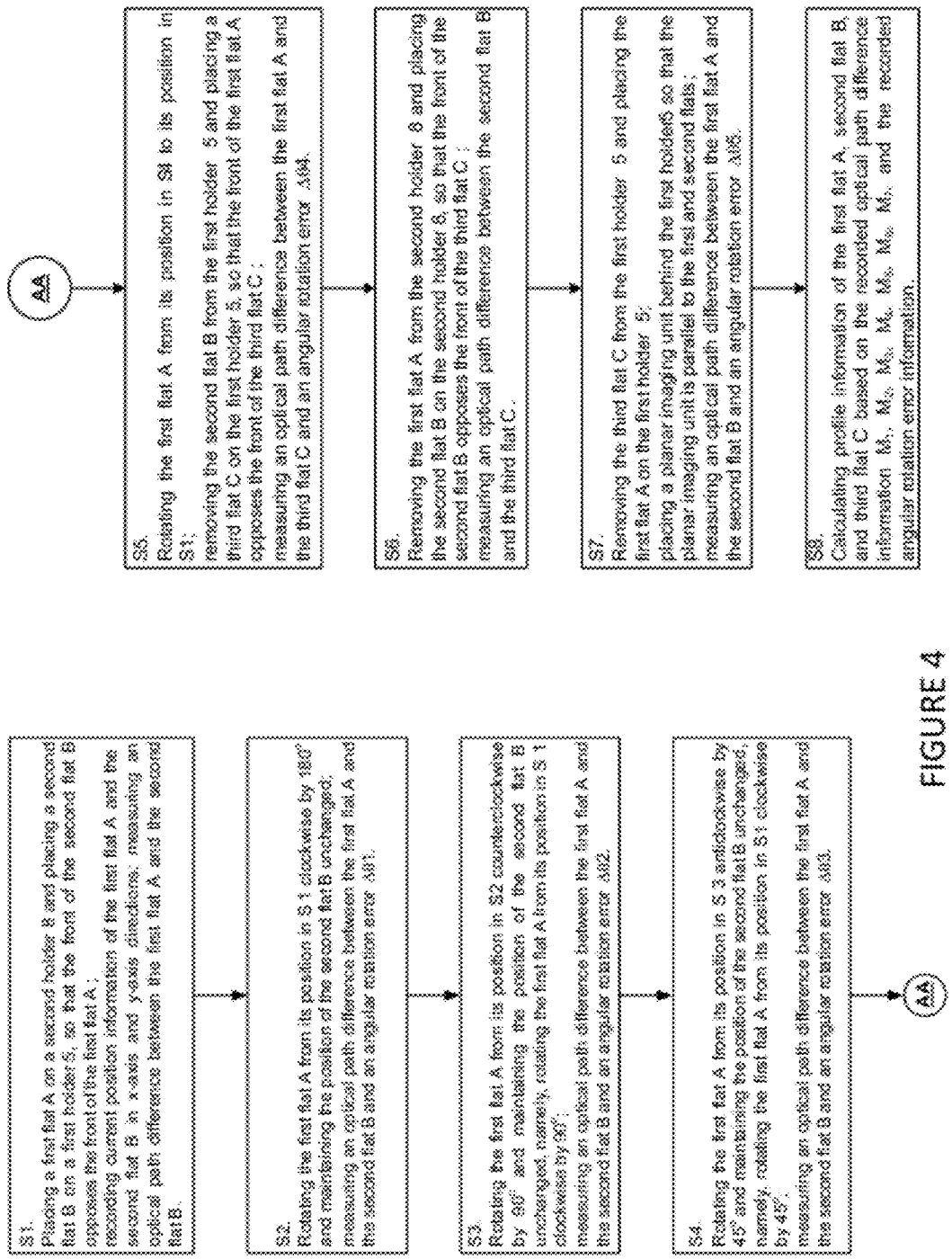
FIG. 4 is a flowchart illustrating a method for detecting an optical profile according to embodiments of the present technology.
Figure 5:
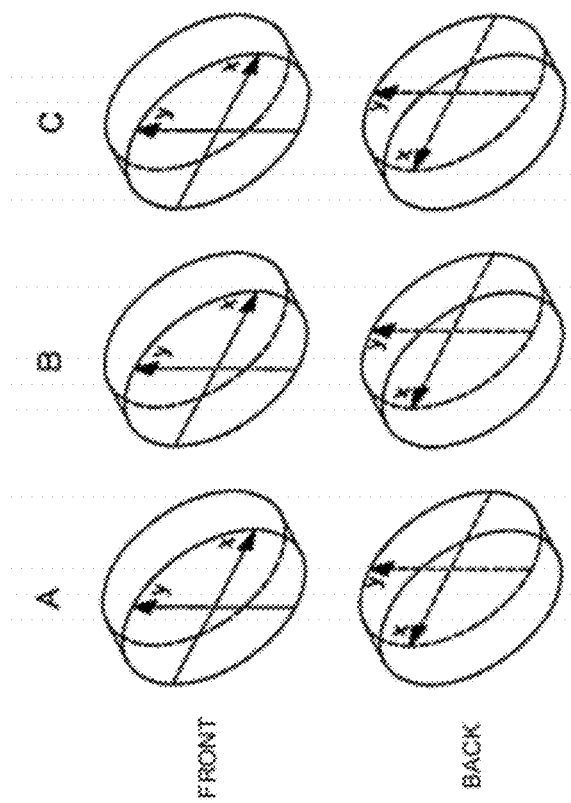
FIG. 5 is a schematic diagram showing test flats of test flat mirrors.
Figure 8:
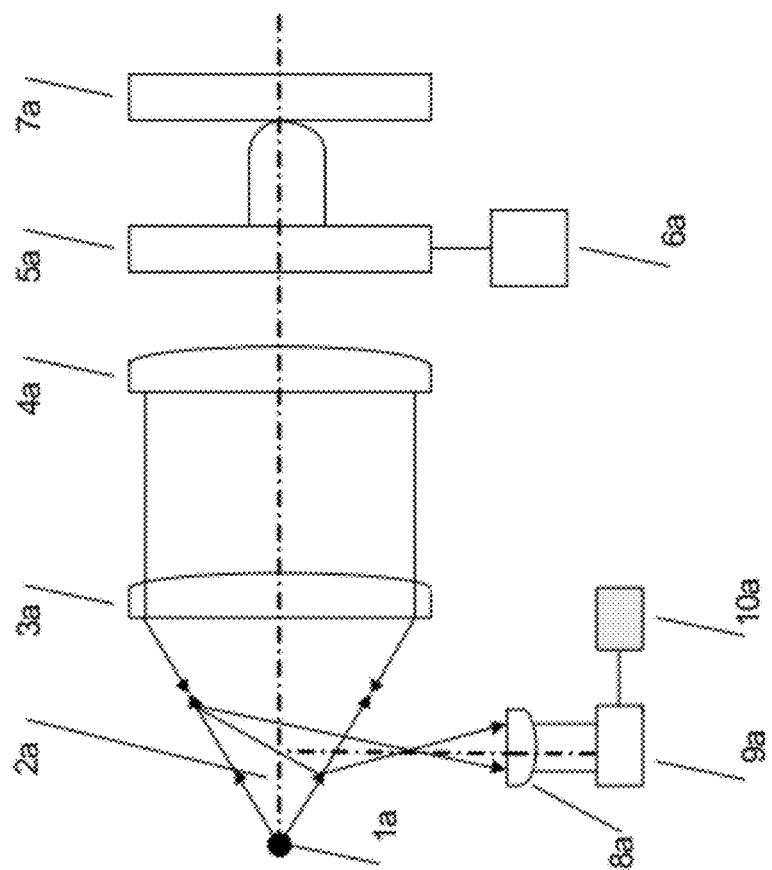
FIG. 8 schematically shows an apparatus for the conventional six-step absolute measurement technique.

FIG. 3 schematically shows relative positions of the two test flats in the apparatus in FIGS. 1 and 2 during a measurement process for detecting an optical profile according to embodiments of the present technology. FIG. 4 is a flowchart showing the measurement process, and FIG. 5 is a schematic diagram showing the test flat mirrors during the measurement process. As shown in FIG. 4, in certain embodiments, the measurement process adopts an absolute measurement technique, which can simultaneously measure a profile error of the test flats of the Fizeau interferometer by cross detection of three flats. In other embodiments, other suitable measurement techniques can also be adopted.

In the embodiment illustrated in FIG. 4, for flat mirrors, as shown in FIG. 5, the flats to be measured are defined as test flats. The test flats of three test flat mirrors are respectively numbered as a first test flat, a second test flat, and a third test flat. The first test flat mirror is placed in the second holder 8 and the second test flat mirror is placed in the first holder 5, so that the second test flat faces the first test flat. Position information of the first test flat and the second test flat in an x-axis direction and a y-axis direction is recorded.

A current position of the first test flat is defined as its original position. An optical path difference between the first test flat and the second test flat is measured. light emitted by the laser 1 passes through the beam splitter 2 and then through the collimation optical unit 3 and 4 and illuminates the second test flat on the first holder 5, and is reflected to form a reference light. Light passing through the second test flat on the first holder 5 and illuminating the first test flat on the second holder 8 is reflected and interfered with the reference light to form test light.

The test light produced by interference between the light reflected by the second test flat on the first holder 5 and the light reflected by the first test flat on the second holder 8 converges on the CCD detector 11 via the collimation optical unit 3 and 4 and the convergence optical unit 10, to form an interference pattern, which is recorded by the CCD detector 11 and then is stored and processed by the computer 12. The phase shifter 6 is connected to the first holder 5, and is adapted for controlling the phase shift of the second test flat on the first holder 5 to produce a plurality of interference patterns.

The optical path difference information can be obtained by processing the interference patterns as follows:

$$M_1 = A + B^x,$$

where $\underline{A}$ represents profile information of the first test flat, $\underline{B}$ represents profile information of the second test flat; A and B are functions of x, y coordinates, i.e., A=A(x,y), B=B(x,y). $M_1$ represents an optical path difference between the first test flat and the second test flat in the first interference measurement.

Figure 6:
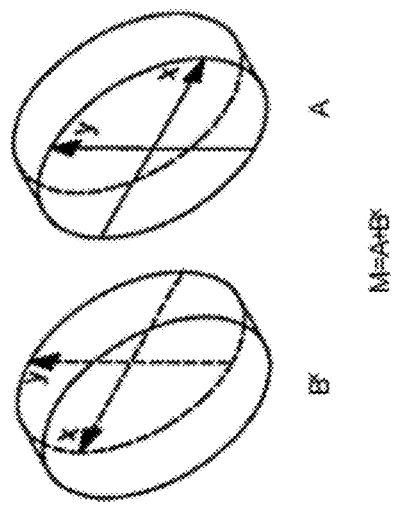
FIG. 6 schematically shows interference between a first test flat and a second test flat.

FIG. 6 schematically shows relative positions of the first test flat and the second test flat when the interference measurement is performed. An x-axis direction of the first test flat is defined as a positive direction, and when the first test flat opposes the second test flat, the x-axis of the second test flat is reversed about a y-axis, and thus $B^x = B(-x, y)$.

Subsequently, during stage S2, the first test flat is rotated clockwise from its original position in stage S1 by 180° and the position of the second test flat is unchanged. An optical path difference between the first test flat and the second test flat is measured. Because the second holder has a rotation error, an angle value of a current position of the first test flat with respect to its original position during stage S1 is measured by an angular measurement unit 9, which is then subtracted by 180° to obtain an angular rotation error Δθ1 for stage S2. Thus, $M_2$ is calculated as follows:

$$M_2 = A^{180°+\Delta\theta 1} + B^x,$$

where $A^{180°+\Delta\theta 1}$ represents profile information of the first test flat after being rotated clockwise by 180°+Δθ1 degrees from its original position in stage S1. $B^x$ represents the profile information of the second test flat after its x-axis is reversed about the y-axis. $M_2$ represents, after interference occurs between the first test flat and the second test flat, an optical path difference between the first test flat, after being rotated clockwise by 180°+Δθ1 degrees from its original position in stage S1, as shown in FIG. 3.

During stage S3, the first test flat is rotated counterclockwise by 90° from its position in stage S2 and the position of the second test flat is unchanged. An optical path difference between the first test flat and the second test flat is measured. Because the second holder has a rotation error, an angle value of a current position of the first test flat with respect to its original position in stage S1 is measured, which is then subtracted by 90° to obtain an angular rotation error Δθ2 of stage S3. $M_3$ can be calculated as follows:

$$M_3 = A^{90°+\Delta\theta 2} + B^x$$

where $A^{90°+\Delta\theta 2}$ represents profile information of the first test flat after being rotated clockwise from its original position in stage S1 by 90°+Δθ2 degrees. $B^x$ represents the profile information of the second test flat after its x-axis being reversed about the y-axis. $M_3$ represents, after interference occurs between the first test flat and the second test flat, an optical path difference between the first test flat, after being rotated clockwise by 90°+$\Delta\theta2$ degrees as shown in FIG. 3.

During a subsequent stage S4, the first test flat is rotated counterclockwise from its position in stage S3 by 45° and the position of the second test flat is unchanged. An optical path difference between the first test flat and the second test flat is measured. An angle value of a current position of the first test flat with respect to its original position in stage S1 is measured, which is then subtracted by 45° to obtain an angular rotation error $\Delta\theta3$ of stage S4. $M_4$ can be calculated as follows:

$$M_4 = A^{45°+\Delta\theta3} + B^x$$

where $A^{45°+\Delta\theta3}$ represents profile information of the first test flat after being rotated clockwise from its original position in stage S1 by 45°+$\Delta\theta3$ degrees. $B^x$ represents the profile information of the second test flat after its x-axis being reversed about the y-axis. $M_4$ represents, after interference occurs between the first test flat and the second test flat an optical path difference between the first test flat, after being rotated by 45°+$\Delta\theta3$ degrees, as shown in FIG. 3.

During a subsequent stage S5, the first test flat is rotated counterclockwise from its position in stage S4 to its original position in stage S1. The second test flat mirror is removed from the first holder 5 and a third test flat mirror is placed on the first holder 5, so that the first test flat opposes the third test flat. An optical path difference between the first test flat and the third test flat is measured. An angular rotation error $\Delta\theta4$ of a current position of the first test flat in stage S5 with respect to its original position in stage S1 is measured. Then, $M_5$ can be calculated as follows:

$$M_5 = A^{\Delta\theta4} + C^x,$$

where $A^{\Delta\theta4}$ represents profile information of the first test flat after being rotated from its position in stage S4 to its original position in stage S1 with the angular rotation error $\Delta\theta4$, $C^x$ represents profile information of the third test flat after its x-axis being reversed about the y-axis; and $M_5$ represents, after interference occurs between the first test flat and the third test flat, an optical path difference between the first test flat, after being rotated to its original position in stage S1 with the angular rotation error $\Delta\theta4$, as shown in FIG. 3.

During stage S6, the first test flat mirror is removed from the second holder 8, and the second test flat mirror is placed on the second holder 8, so that the second test flat opposes the third test flat. An optical path difference $M_6$ between the second test flat and the third test flat is measured as:

$$M_6 = B + C^x,$$

where B represents the profile information of the second test flat, $C^x$ represents the profile information of the third test flat after its x-axis being reversed about the y-axis; and $M_6$ represents an optical path difference between the second test flat and the third test flat, as shown in FIG. 3.

During stage S7, the third test flat mirror is removed from the first holder 5, and the first test flat mirror is placed on the first holder 5. A planar imaging unit 7 is inserted behind the first holder 5, so that the planar imaging unit 7 is placed between the first test flat on the first holder 5 and the second test flat on the second holder 8. The surfaces of the planar imaging unit 7 are generally parallel to the first test flat and the second test flat. An optical path difference between the first test flat and the second test flat is measured. FIG. 7 schematically shows the interference measurement when the first test flat and the second test flat have a consistent x-axis direction.

An angular rotation error $\Delta\theta5a$ of a current position of the first test flat in stage S7 with respect to its original position in stage S1 is measured. An angular rotation error $\Delta\theta5b$ of a current position of the second test flat in stage S7 with respect to its original position in stage S1 is measured.

$$M_{mid} = A^{\Delta\theta5a} + B^{\Delta\theta5b}$$

$M_{mid}$ is assumed to be rotated an angular $-\Delta\theta5b$ then $$M_7 = A^{\Delta\theta5} + B = M_{mid}^{-\Delta\theta5b} = A^{\Delta\theta5a-\Delta\theta5b} + B^{\Delta\theta5b-\Delta\theta5b},$$
$$\Delta\theta5 = \Delta\theta a - \Delta\theta b$$

$M_7$ can thus be calculated as:

$$M_7 = A^{\Delta\theta5} + B,$$

where $A^{\Delta\theta5}$ represents profile information of the first test flat with its current position having an angular rotation error $\Delta\theta5$ with respect to its original position in stage S1, B represents the profile information of the second test flat; and $M_7$ represents an optical path difference between the first test flat and the second test flat.

During another stage S8, based on the recorded optical path differences $M_1, M_2, M_3, M_4, M_5, M_6$ and $M_7$ and the recorded rotation errors $\Delta\theta1, \Delta\theta2, \Delta\theta3, \Delta\theta4$ and $\Delta\theta5$ the profile information of the first test flat, the profile information of the second test flat, and the profile information of the third test flat can be calculated by, for example, the computer 12.

In the process described above, one planar imaging unit is added in stage S7 to produce the measurement result $M_7 = A^{\Delta\theta5} + B$ of A+B, and the angular error $\Delta\theta5$ is measured.

Without being bound by theory, it is believed that in Cartesian coordinates, a continuous function F(x, y) can be represented as a sum of an odd-odd function, an even-even function, an odd-even function, and an even-odd function:

$$F(x,y) = F_{ee} + F_{oo} + F_{oe} + F_{eo},$$

where x, y represent x, y coordinates of Cartesian coordinates, ee represents an even-even component, oo represents an odd-odd component, eo represents an even-odd component, and oe represents an odd-even component.

According to the characteristic of the odd-even function, $$F_{ee}(x, y) = \frac{F(x, y) + F(-x, y) + F(x, -y) + F(-x, -y)}{4},$$

$$F_{oo}(x, y) = \frac{F(x, y) - F(-x, y) - F(x, -y) + F(-x, -y)}{4},$$

$$F_{oe}(x, y) = \frac{F(x, y) - F(-x, y) + F(x, -y) - F(-x, -y)}{4},$$

$$F_{eo}(x, y) = \frac{F(x, y) + F(-x, y) - F(x, -y) - F(-x, -y)}{4}.$$

Therefore, the planar profile information of the first test flat, the second test flat, and the third test flat can be deemed as a binary function of the coordinates x, y. Accordingly, the planar profile of the first test flat, the second test flat, and the third test flat can be represented by:

$$A = A_{ee} + A_{oe} + A_{eo} + A_{oo},$$

$$B = B_{ee} + B_{oe} + B_{eo} + B_{oo},$$

$$C = C_{ee} + C_{oe} + C_{eo} + C_{ee}.$$

During detection, interference occurs between two flats opposing each other, so one flat can be considered to be reversed. Assuming that the interference occurs between two flats F(x, y) and G(x, y), two operators $[\ ]^x$ and $[\ ]^\theta$ may be defined, where $[\ ]^x$ is a reverse operator, and $[\ ]^\theta$ is a rotation operator:

$$[F(x,y)]^x = F(-x,y),$$

$$[F(x,y)]^\theta = F(x\cos\theta - y\sin\theta, x\sin\theta + y\sin\theta).$$

Therefore, $$[F(x,y)]^{180°} = F(-x,-y),$$

and thus $$F(x,y) + G(-x,y) = F(x,y) + [G(x,y)]^x.$$

By applying the two operators to the equations:

$$[F(x,y)]^{180°} = F_{ee} + F_{oo} - F_{oe} - F_{eo},$$

and $$[F(x,y)]^x = F_{ee} - F_{oo} - F_{oe} + F_{eo}.$$

The equations above shows that the even-odd function, the odd-even function, the even-even function, and the odd-odd function may be derived from simultaneous equations by means of rotation. It has been found that the first three functions can be easily derived by means of rotation, but the odd-odd function is difficult to obtain.

In polar coordinates, the period of $\theta$ is 360°, and a periodic function can be represented by Fourier series. The period of the odd-odd function in the polar coordinates is 180°. The function $F_{oo}(x, y)$ may be represented by a sum of Fourier series:

$$F_{oo}(x, y) = \sum_{m=1} f_{2m}\sin(2m\theta),$$

where $x^2 + y^2 = $ constant, $f_{2m}$ is a corresponding coefficient, and the subscript m is a natural number. In order to emphasize that the base frequency of $F_{oo}(x, y)$ is 2 (the period being 180°), the subscript of $F_{oo}(x,y)$ is replaced by $2\theta$, and the equations may be written as:

$$F_{oo} = F_{oo,2\theta} = F_{oo,2odd\theta} + F_{oo,2even\theta},$$

$$F_{oo,2even\theta} = \sum_{m=even} f_{2m}\sin(2m\theta) = \sum_{m=1} f_{4m}\sin(4m\theta) = F_{oo,4\theta},$$

$$F_{oo,2odd\theta} = \sum_{m=odd} f_{2m}\sin(2m\theta).$$

The subscript $4\theta$ represents that the base frequency of is 4 (the period being) 90°, as shown in the above equations, $F_{oo,4\theta}$ may be written as:

$$F_{oo,4\theta} = F_{oo,4odd\theta} + F_{oo,4even\theta},$$

$$F_{oo,4odd\theta} = \sum_{m=odd} f_{4m}\sin(4m\theta),$$

$$F_{oo,4even\theta} = \sum_{m=even} f_{4m}\sin(4m\theta).$$

Therefore, an odd-odd function may be represented as a sum of a series of $nodd\theta$, where $n = 2, 4, 8, 16, 32, \ldots$.

$$F_{oo,2\theta} = F_{oo,2odd\theta} + F_{oo,4odd\theta} + F_{oo,8odd\theta} + F_{oo,16odd\theta} + \cdots$$

By applying the rotation operator, the odd-odd function may be represented by:

$$[F_{oo,2\theta}]^{90°} = -F_{oo,2odd\theta} + F_{oo,2even\theta},$$

$$[F_{oo,4\theta}]^{45°} = -F_{oo,4odd\theta} + F_{oo,4even\theta}.$$

Therefore, the profile information may be written in the below form, in which the odd-odd function portion is replaced by its two frequency components: $2odd\theta$ and $4odd\theta$:

$$A = A_{ee} + A_{oe} + A_{eo} + A_{oo,2odd\theta} + A_{oo,4odd\theta},$$

$$B = B_{ee} + B_{oe} + B_{eo} + B_{oo,2odd\theta} + B_{oo,4odd\theta},$$

$$C = C_{ee} + C_{oe} + C_{eo} + C_{oo,2odd\theta} + C_{oo,4odd\theta}.$$

In the equations, $A_{ee}$ is the even-even component of the first test flat, $A_{oe}$, is the odd-even component of the first test flat, $A_{eo}$ is the even-odd component of the first test flat, $A_{oo,2odd\theta}$ is the part with a base frequency of 2 in the odd-odd component of the first test flat, and $A_{oo,4odd\theta}$ is the part with a base frequency of 4 in the odd-odd component of the first test flat; $B_{ee}$ is the even-even component of the second test flat, $B_{oe}$ is the odd-even component of the second test flat, $B_{eo}$ is the even-odd component of the second test flat, $B_{oo,2odd\theta}$ is the part with a base frequency of 2 in the odd-odd component of the second test flat, and $B_{oo,4odd\theta}$ is the part with a base frequency of 4 in the odd-odd component of the second test flat; $C_{ee}$ is the even-even component of the third test flat, $C_{oe}$ is the odd-even component of the third test flat, $C_{eo}$ is the even-odd component of the third test flat, $C_{oo,2odd\theta}$ is the part with a base frequency of 2 in the odd-odd component of the third test flat, and $C_{oo,4odd\theta}$ is the part with a base frequency of 4 in the odd-odd component of the third test flat.

The foregoing measurement process may be represented by:

$$M_1 = A + B^x,$$

$$M_2 = A^{180° + \Delta\theta 1} + B^x,$$

$$M_3 = A^{90° + \Delta\theta 2} + B^x,$$

$$M_4 = A^{45° + \Delta\theta 3} + B^x,$$

$$M_5 = A^{\Delta\theta 4} + C^x,$$

$$M_6 = B + C^x,$$

$$M_7 = A^{\Delta\theta 5} + B,$$

where $\Delta\theta 1$, $\Delta\theta 2$, $\Delta\theta 3$, $\Delta\theta 4$ and $\Delta\theta 5$ are angular rotation errors, which are measured by the angular measurement instrument and stored.

The rotation absolute measurement process according to the present technology is based on the angular measurement errors as below:

$$A \approx \frac{A + A^{\Delta\theta 5 - \Delta\theta 4}}{2} = \frac{(M_5 - M_6 + M_7)^{-\Delta\theta 4}}{2},$$

$$B^x = M_1 - A = M_1 - \frac{(M_5 - M_6 + M_7)^{-\Delta\theta 4}}{2},$$

$$A^{180° + \Delta\theta 1} = M_2 - B^x = M_2 - M_1 + \frac{(M_5 - M_6 + M_7)^{-\Delta\theta 4}}{2},$$

$$A^{180°} = (M_2 - M_1)^{-\Delta\theta 1} + \frac{(M_5 - M_6 + M_7)^{-\Delta\theta 4 - \Delta\theta 1}}{2},$$

-continued $$M_1 = A + B_x,$$

$$M_2' = A^{180°} + B^x = (M_2 - M_1)^{-\Delta\theta 1} + \frac{(M_5 - M_6 + M_7)^{-\Delta\theta 4 - \Delta\theta 1}}{2} + M_1 - \frac{(M_5 - M_6 + M_7)^{-\Delta\theta 4}}{2},$$

$$M_3' = A^{90°} + B^x = (M_3 - M_1)^{-\Delta\theta 2} + \frac{(M_5 - M_6 + M_7)^{-\Delta\theta 4 - \Delta\theta 2}}{2} + M_1 - \frac{(M_5 - M_6 + M_7)^{-\Delta\theta 4}}{2},$$

$$M_4' = A^{45°} + B^x = (M_4 - M_1)^{-\Delta\theta 3} + \frac{(M_5 - M_6 + M_7)^{-\Delta\theta 4 - \Delta\theta 3}}{2} + M_1 - \frac{(M_5 - M_6 + M_7)^{-\Delta\theta 4}}{2},$$

$$M_5' = \frac{M_5 - M_6 + M_7}{2} + \frac{M_5 - 3(M_7 - M_6)}{4} + \frac{(M_5 - M_6 + M_7)^{\Delta\theta 5 - \Delta\theta 4}}{4},$$

$$M_6 = B + C^x,$$

where $M_1$, $M_2$, $M_3$, $M_4$, $M_5$, $M_6$ and $M_7$ are optical path information; $M_2'$, $M_3'$, $M_4'$, and $M_5'$ are results obtained after angular error modification; and $B^x$ represents the profile information after the x-axis of the test flat is reversed about the y-axis.

The profile information $\underline{A}$ of the first test flat, the profile information $\underline{B}$ of the second test flat, and the profile information $\underline{C}$ of the third test flat can be calculated based on the results obtained after angular error modification as below:

$$A_{oe} + A_{eo} = (M_1 - M_2')/2,$$

$$B_{oe} + B_{eo} = \{[M_1 - (M_1)^{180°}]/2 - (A_{oe} + A_{eo})\}^x,$$

$$C_{oe} + C_{eo} = \{[M_5' - (M_5')^{180°}]/2 - (A_{oe} + A_{eo})\}^x,$$

$$A_{ee} = \{[M_1 + (M_1)^{180°}]/2 + [M_5' + (M_5')^{180°}]/2 - [M_6 + (M_6)^{180°}]/2 + ([M_1 + (M_1)^{180°}]/2 + [M_5' + (M_5')^{180°}]/2 - [M_6 + (M_6)^{180°}]/2)^x\}/4,$$

$$B_{ee} = \{[M_1 + (M_1)^{180°}]/2 + [M_1 + (M_1)^{180°}]^x/2 - 2A_{ee}\}/2,$$

$$C_{ee} = \{[M_5' + (M_5')^{180°}]/2 + [M_5' + (M_5')^{180°}]^x/2 - 2A_{ee}\}/2,$$

$$A_{oo,2odd\theta} = [M_1 - (A_{oe} + A_{eo} + A_{ee}) - M_3' + (A_{oe} + A_{eo} + A_{ee})^{90°}]/2,$$

$$B_{oo,2odd\theta} = \{[M_1 - (A_{oe} + A_{eo} + A_{ee}) - (B_{oe} + B_{eo} + B_{ee})^x]^{90°} - M_3' + (A_{oe} + A_{eo} + A_{ee}) + (B_{oe} + B_{eo} + B_{ee})^x\}/2,$$

$$C_{oo,2odd\theta} = \{[M_6 - (B_{oe} + B_{eo} + B_{ee}) - (C_{oe} + C_{eo} + C_{ee})]^{90°} - M_6 + (B_{oe} + B_{eo} + B_{ee}) + (C_{oe} + C_{eo} + C_{ee}) + 2B_{oo,2odd\theta}\}/2,$$

$$A_{oo,4odd\theta} = [M_1 - (A_{oe} + A_{eo} + A_{ee} + A_{oo,2odd\theta}) - M_4' + (A_{oe} + A_{eo} + A_{ee} + A_{oo,2odd\theta})^{45°}]/2$$

$$B_{oo,4odd\theta} = \left\{ \begin{array}{l} [M_1 - (A_{oe} + A_{eo} + A_{ee} + A_{oo,2odd\theta}) - \\ (B_{oe} + B_{eo} + B_{ee} + B_{oo,2odd\theta})^x]^{45°} - \\ M_4' + (A_{oe} + A_{eo} + A_{ee} + A_{oo,2odd\theta})^{45°} + \\ (B_{oe} + B_{eo} + B_{ee} + B_{oo,2odd\theta})^x \end{array} \right\} / 2$$

$$C_{oo,4odd\theta} = \left\{ \begin{array}{l} [M_6 - (B_{oe} + B_{eo} + B_{ee} + B_{oo,2odd\theta}) - \\ (C_{oe} + C_{eo} + C_{ee} + C_{oo,2odd\theta})^x]^{45°} - \\ M_6 + (B_{oe} + B_{eo} + B_{ee} + B_{oo,2odd\theta}) + \\ (C_{oe} + C_{eo} + C_{ee} + C_{oo,2odd\theta})^x \end{array} \right\} / 2$$

Based on the above results, we may obtain:

$$A = A_{ee} + A_{oe} + A_{eo} + A_{oo,2odd\theta} + A_{oo,4odd\theta},$$

$$B = B_{ee} + B_{oe} + B_{eo} + B_{oo,2odd\theta} + B_{oo,4odd\theta},$$

$$C = C_{33} + C_{oe} + C_{eo} + C_{oo,2odd\theta} + C_{oo,4odd\theta}.$$

In the equations, $A_{ee}$ is the even-even component of the first test flat, $A_{oe}$ is the odd-even component of the first test flat, $A_{eo}$ is the even-odd component of the first test flat, $A_{oo,2odd\theta}$ is the part with a base frequency of 2 in the odd-odd component of the first test flat, and $A_{oo,4odd\theta}$ is the part with a base frequency of 4 in the odd-odd component of the first test flat. $B_{ee}$ is the even-even component of the second test flat, $B_{oe}$ is the odd-even component of the second test flat, $B_{eo}$ is the even-odd component of the second test flat, $B_{oo,2odd\theta}$ is the part with a base frequency of 2 in the odd-odd component of the second test flat, and $B_{oo,4odd\theta}$ is the part with a base frequency of 4 in the odd-odd component of the second test flat. $C_{ee}$ is the even-even component of the third test flat, $C_{oe}$ is the odd-even component of the third test flat, $C_{eo}$ is the even-odd component of the third test flat, $C_{oo,2odd\theta}$ is the part with a base frequency of 2 in the odd-odd component of the third test flat, and $C_{oo,4odd\theta}$ is the part with a base frequency of 4 in the odd-odd component of the third test flat.

$M_1$, $M_2$, $M_3$, $M_4$, $M_5$, $M_6$ and $M_7$ are optical path information; $M_2'$, $M_3'$, $M_4'$, and $M_5'$ are results obtained after angular error modification; and $B^x$ represents the profile information after the x-axis of the test flat is reversed about the y-axis. For the function $F(x,y)$, two operators $[\ ]^x$ and $[\ ]^\theta$ are defined, wherein $[\ ]^x$ is a reverse operator, and $[\ ]^\theta$ is a rotation operator:

$$[F(x,y)]^x = F(-x,y),$$

$$[F(x,y)]^\theta = F(x \cos \theta - y \sin \theta, x \sin \theta + y \cos \theta).$$

Therefore, $$[F(x,y)]^{180°} = F(-x,-y),$$

and thus $$F(x,y) + G(-x,y) = F(x,y) + [G(x,y)]^x.$$

By applying the two operators to the equations we may obtain:

$$[F(x,y)]^{180°} = F_{ee} + F_{oo} - F_{oe} - F_{eo},$$

and $$[F(x,y)]^x = F_{ee} - F_{oo} - F_{oe} + F_{eo}.$$

The definition to the operation of the function F may be applied to the first test flat, the second test flat, the third test flat, a combination thereof, a combination of frequency components thereof, a combination of optical path difference information $M_1$, $M_2$, $M_3$, $M_4$, $M_5$, $M_6$ and $M_7$, and/or a combination of optical path difference information $M_2'$, $M_3'$, $M_4'$, and $M_5'$ obtained after angular error modification.

From the process described above, it can be seen that the error caused by the rotation angle changes to $\Delta\theta 5 - \Delta\theta 4$ from $\Delta\theta 1$, $\Delta\theta 2$, $\Delta\theta 3$, $\Delta\theta 4$. The measurement accuracy can thus be improved.

Figure 10B:
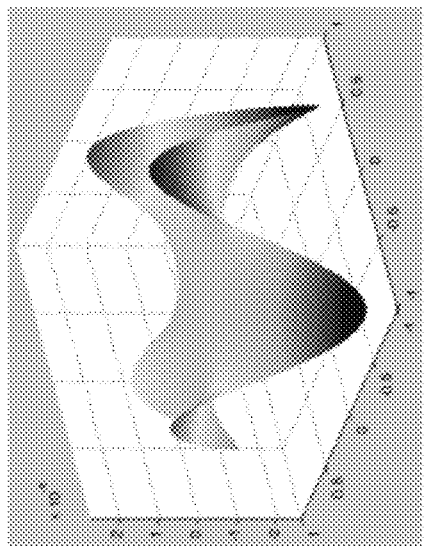
FIGS. 10a, 10b, and 10c are diagrams showing simulation images of Zernike fit according to embodiments of the present technology.
Figure 10C:
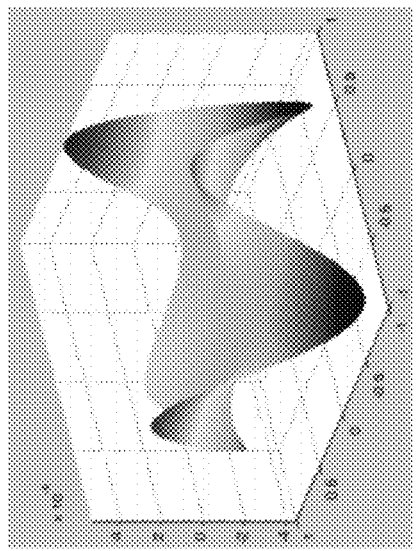
Figure 10A:
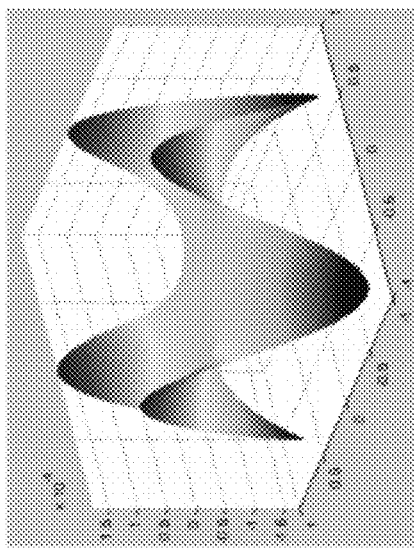
Figure 11B:
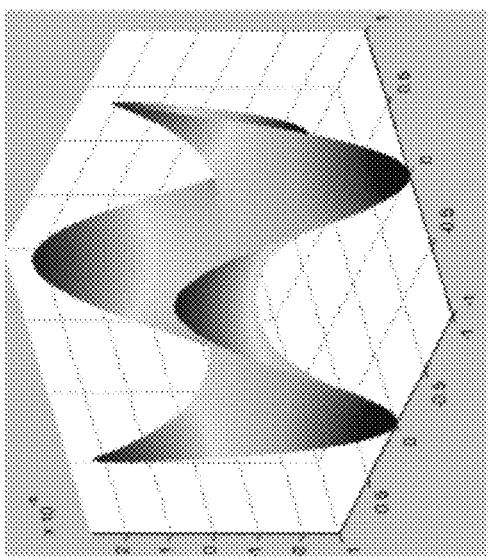
FIGS. 11a, 11b, and 11c are diagrams showing differences between the simulation result and a true profile by assuming an angular rotation error according to embodiments of the present technology.
Figure 11C:
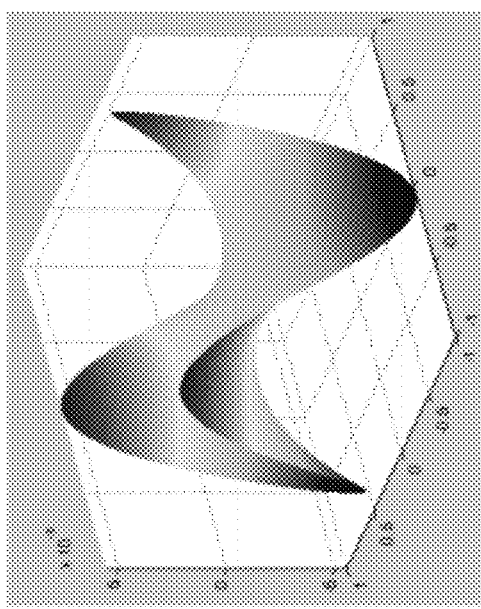
Figure 11A:
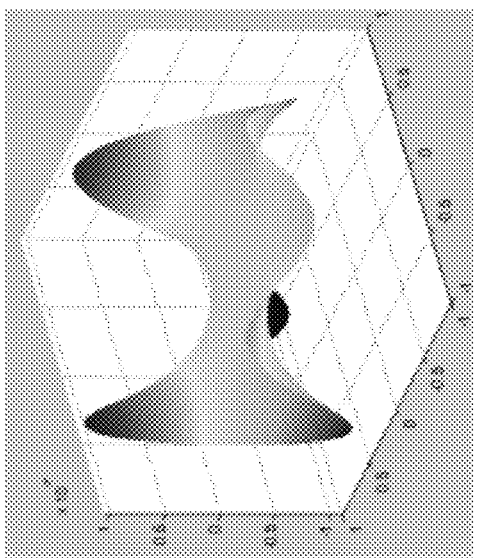
Figure 12A:
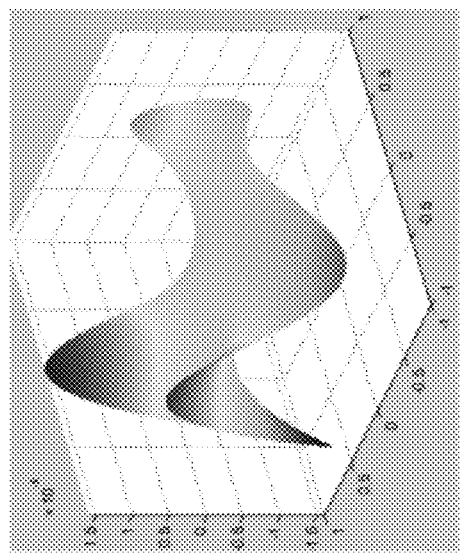
FIGS. 12a, 12b, and 12c are diagrams showing differences between the simulation result and a true profile by assuming the same angular rotation error according to the conventional six-step absolute measurement technique.
Figure 12B:
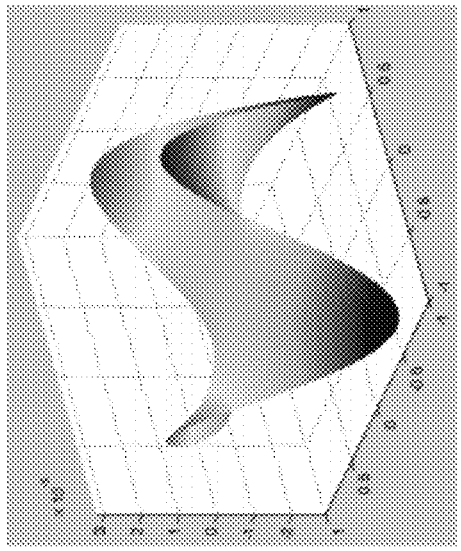
Figure 12C:
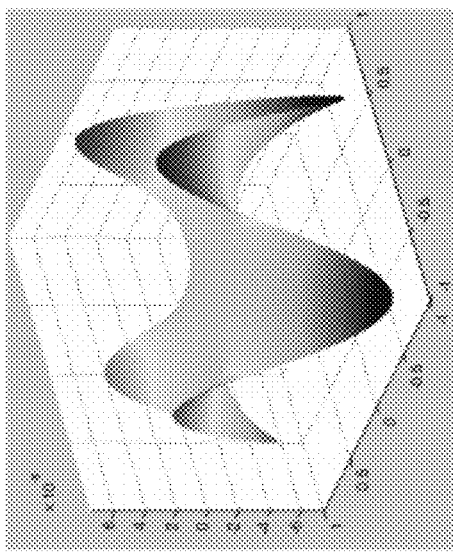

The process results are simulated as shown in FIGS. 10a, 10b, and 10c. The first test flat shown in FIG. 10a, the second test flat shown in FIG. 10b, and the third test flat shown in FIG. 10c are generated by 36 Zernike coefficients. A program listing for performing a Zernike fit is shown in the Appendix. Assuming the angular rotation errors are $\Delta\theta 1 = 0.8°$, $\Delta\theta 2 = 0.1°$, $\Delta\theta 3 = 0.5°$, $\Delta\theta 4 = 0.7°$, $\Delta\theta 5 = 0.9°$, the results of the foregoing measurement process are shown as detection errors of the first test flat compared with the original profile shown in FIG. 11a-11c. The results of the prior art six-stage measurement process are shown in FIG. 12a-12c.

A program listing for implementing a Zernike fit flat process, certain embodiments of the process described above, and the rotation process in Matlab are included in the Appendices I-III, which forms part of the present disclosure. In other embodiments, the foregoing processes may be implemented in other suitable languages and/or systems.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

APPENDIX I

Zernike Fit process

```
function shap=zernike_36(a)
wl=632.8e-3;
P_V=0.01*wl;
znikexs=a;
D=50;
w_r=361;
w_a =3600;
for m=1:1:w_r
    for n=1:1:w_a
%
        r=m/(w_r-1)-1/(w_r-1);
        a=n*(pi*2/(w_a));
        z(1)=1;
        z(2)=r*cos(a);
        z(3)=r*sin(a);
        z(4)=2*r^2-1;
```

APPENDIX I-continued

Zernike Fit process

```
        z(5)=r^2*cos(2*a);
        z(6)=r^2*sin(2*a);
        z(7)=(3*r^2-2)*r*cos(a);
        z(8)=(3*r^2-2)*r*sin(a);
        z(9)=6*r^4-6*r^2+1;
        z(10)=r^3*cos(3*a);
        z(11)=r^3*sin(3*a);
        z(12)=(4*r^2-3)*r^2*cos(2*a);
        z(13)=(4*r^2-3)*r^2*sin(2*a);
        z(14)=(10*r^4-12*r^2+3)*r*cos(a);
        z(15)=(10*r^4-12*r^2+3)*r*sin(a);
        z(16)=20*r^6-30*r^4+12*r^2-1;
        z(17)=r^4*cos(4*a);
        z(18)=r^4*sin(4*a);
        z(19)=(5*r^2-4)*r^3*cos(3*a);
        z(20)=(5*r^2-4)*r^3*sin(3*a);
        z(21)=(15*r^4-20*r^2+6)*r^2*cos(2*a);
        z(22)=(15*r^4-20*r^2+6)*r^2*sin(2*a);
        z(23)=(35*r^6-60*r^4+30*r^2-4)*r*cos(a);
        z(24)=(35*r^6-60*r^4+30*r^2-4)*r*sin(a);
        z(25)=70*r^8-140*r^6+90*r^4-20*r^2+1;
        z(26)=r^5*cos(5*a);
        z(27)=r^5*sin(5*a);
        z(28)=(6*r^2-5)*r^4*cos(4*a);
        z(29)=(6*r^2-5)*r^4*sin(4*a);
        z(30)=(21*r^4-30*r^2+10)*r^3*cos(3*a);
        z(31)=(21*r^4-30*r^2+10)*r^3*sin(3*a);
        z(32)=(56*r^6-105*r^4+60*r^2-10)*r^2*cos(2*a);
        z(33)=(56*r^6-105*r^4+60*r^2-10)*r^2*sin(2*a);
        z(34)=(126*r^8-280*r^6+210*r^4-60*r^2+5)*r*cos(a);
        z(35)=(126*r^8-280*r^6+210*r^4-60*r^2+5)*r*sin(a);
        z(36)=252*r^10-630*r^8+560*r^6-210*r^4+30*r^2-1;
        sharp(m,n)=z*znikexs';
    end
end
p_v=max(max(sharp))-min(min(sharp));
I=cos(sharp*2*pi/wl);
shap=sharp;
```

APPENDIX II

Main process

```
clear
clc
a=[0,0,0,0,0,0,0,0,0,0.0005,0,0,0,0,0,0,0,0.0005,0,0,0,0,0,0,0,0,0,0,0,0,0,0,0,0,0];
surfa=zernike_36(a);
b=[0,0,0,0,0,0,0,0,0,0.0005,0,0,0,0,0,0,0,0.0005,0,0,0,0,0,0,0,0,0,0,0,0,0,0,0,0,0];
surfb=zernike_36(b);
c=[0,0,0,0,0,0,0,0,0,0.0005,0,0,0,0,0,0,0,0.0005,0,0,0,0,0,0,0,0,0,0,0,0,0,0,0,0,0];
surfc=zernike_36(c);
dirt1=8;
dirt2=1;
dirt3=5;
dirt4=7;
dirt5=9;
rotation180=1800;
rotation90=900;
rotation45=450;
surfa180=rotation(surfa,(rotation180+dirt1));
surfa90=rotation(surfa,(rotation90+dirt2));
surfa45=rotation(surfa,(rotation45+dirt3));
surfbback=back(surfb);
surfcback=back(surfc);
M11=surfa+surfbback;
M21=surfa180+surfbback;
M31=surfa90+surfbback;
M41=surfa45+surfbback;
M51=rotation(surfa,dirt4)+surfcback;
M61=surfb+surfcback;
M71=rotation(surfa,dirt5)+surfb;
A=rotation((M51-M61+M71)/2,3600-dirt4);
Bx=M11-A;
A180dirt1=M21-Bx;
A180=rotation(A180dirt1,3600-dirt1);
```

APPENDIX II-continued

Main process

```
        M1=M11;
        M2=A180+Bx;
        M3=rotation((M31-Bx),3600-dirt2)+Bx;
        M4=rotation((M41-Bx),3600-dirt3)+Bx;
        M5=(M51-M61+M71)/2+(M51-3*(M71-M61))/4+rotation((M51-M61+M71)/4,(dirt5-
dirt4));
        M6=M61;
        aoeaeo=(M1-M2)/2;
        boebeo=back(((M1-rotation(M1,rotation180))/2-aoeaeo));
        coeceo=back(((M5-rotation(M5,rotation180))/2-aoeaeo));
        m1=(M1+rotation(M1,rotation180))/2;
        m5=(M5+rotation(M5,rotation180))/2;
        m6=(M6+rotation(M6,rotation180))/2;
        aee=(m1+m5-m6+back((m1+m5-m6)))/4;
        bee=(m1+back(m1)-2*aee)/2;
        cee=(m5+back(m5)-2*aee)/2;
        m11=M1-(aoeaeo+aee)-back((boebeo+bee));
        m13=M3-rotation((aoeaeo+aee),rotation90)-back((boebeo+bee));
        m16=M6-(boebeo+bee)-back((coeceo+cee));
        aoo2odd=(m11-m13)/2;
        boo2odd=(rotation(m11,rotation90)-m13)/2;
        coo2odd=(rotation(m16,rotation90)-m16+rotation(m11,rotation90)-m13)/2;
        m11p=M1-(aoeaeo+aee+aoo2odd)-back((boebeo+bee+boo2odd));
        m41p=M4-rotation((aoeaeo+aee+aoo2odd),rotation45)-
back((boebeo+bee+boo2odd));
        m61p=M6-(boebeo+bee+boo2odd)-back((coeceo+cee+coo2odd));
        aoo4odd=(m11p-m41p)/2;
        boo4odd=(rotation(m11p,rotation45)-m41p)/2;
        coo4odd=(rotation(m61p,rotation45)-m61p+rotation(m11p,rotation45)-m41p)/2;
        finala=aee+aoeaeo+aoo2odd+aoo4odd;
        finalb=bee+boebeo+boo2odd+boo4odd;
        finalc=cee+coeceo+coo2odd+coo4odd;
```

APPENDIX III

Rotation process

```
        function shap=rotation(sharp,th)
            for ri=1:1:361
                for aj=1:1:3600
                    if (aj+th)<=3600
                        zrotation(ri,aj+th)=sharp(ri,aj);
                    else
                        zrotation(ri,aj+th-3600)=sharp(ri,aj);
                    end
                end
            end
        shap=zrotation;
```

We claim:

1. A method for detecting an optical profile, the method being characterized in that the method for detecting an optical profile adopting an absolute measurement technique which simultaneously measures a system error of a Fizeau interferometer by cross detection of three flat mirrors, the method comprising steps of:

Step S1: providing a first test flat mirror having a first test flat, a second test flat mirror having a second test flat, and a third test flat mirror having a third test flat;

placing the first test flat mirror in the second holder and placing the second test flat mirror in the first holder so that the first test flat faces the second test flat;

setting the first test flat and the second test flat to oppose each other and recording position information of these two test flats in an x-axis direction and a y-axis direction;

defining a current position of the first test flat as its original position;

measuring an optical path difference between the first test flat and the second test flat, wherein light emitted by the laser passes through the beam splitter and then through the collimation optical unit and illuminates the second test flat on the first holder, and is reflected to form a reference light; light passing through the second test flat on the first holder and illuminating the first test flat on the second holder is reflected and interfered with the reference light to form the test light; the test light converges on the CCD detector, to form an interference pattern, which is recorded by the CCD detector; the computer stores and processes the interference pattern recorded by the CCD detector; the phase shifter performs phase shift to produce a plurality of interference patterns; the interference patterns are processed to calculate an optical path difference as:

$$M_1 = A + B^x,$$

where $\underline{A}$ represents profile information of the first test flat, $\underline{B}$ represents profile information of the second test flat; the first test flat and the second test flat are functions of x, y coordinates, $A=A(x,y)$, $B=B(x,y)$; $M_1$ represents an optical path difference between the first test flat and the second test flat in the first interference measurement; an x-axis direction of the first test flat is defined as a positive direction, so the second test flat on the first holder has an reversed representation of the x-axis about the y-axis as $B^x=B(-x,y)$;

Step S2: rotating the first test flat mirror clockwise from its original position on the second holder in Step S1 by 180° and maintaining the position of the second test flat unchanged;

measuring an optical path difference between the first test flat and the second test flat, measuring an angle value of a current position of the first test flat with respect to its original position in Step S1 to obtain an angular rotation error Δθ1 in Step S2;

calculating $M_2$ as $$M_2 = A^{180°+\Delta\theta1} + B^x,$$

where $A^{180°+\Delta\theta1}$ represents profile information of the first test flat after being rotated clockwise by 180°+Δθ1 degrees, $B^x$ represents the profile information of the second test flat after its x-axis being reversed about the y-axis; and $M_2$ represents, after interference occurs between the first test flat and the second test flat, an optical path difference between the first test flat, after being rotated clockwise by 180°+Δθ1 degrees from its position;

Step S3: rotating the first test flat counterclockwise from its position in Step S2 by 90° and maintaining the position of the second test flat unchanged, namely, rotating the first test flat clockwise from its original position in Step S1 by 90°;

measuring an optical path difference between the first test flat and the second test flat, calculating an angle value of a current position of the first test flat with respect to its original position in Step S1 by subtracting 90° to obtain an angular rotation error Δθ2 in Step S3;

calculating $M_3$ as $$M_3 = A^{90°+\Delta\theta2} + B^x,$$

where $A^{90°+\Delta\theta2}$ represents profile information of the first test flat after being rotated clockwise from its original position by 90°Δθ2 degrees, $B^x$ represents the profile information of the second test flat after its x-axis being reversed about the y-axis; and $M_3$ represents, after interference occurs between the first test flat and the second test flat, an optical path difference between the first test flat, after being rotated clockwise by 90°+Δθ2 degrees, and the second test flat;

Step S4: rotating the first test flat counterclockwise from its position in Step S3 by 45° and maintaining the position of the second test flat unchanged, namely, rotating the first test flat clockwise from its original position in Step S1 by 45°;

measuring an optical path difference between the first test flat and the second test flat, calculating an angle value of a current position of the first test flat with respect to its original position in Step S1 by subtracting 45° to obtain an angular rotation error Δθ3 in Step S4;

calculating $M_4$ as $$M_4 = A^{45°+\Delta\theta3} + B^x,$$

where $A^{45°+\Delta\theta3}$ represents profile information of the first test flat after being rotated clockwise from its original position in Step S1 by 45°+Δθ3 degrees, $B^x$ represents the profile information of the second test flat after its x-axis being reversed about the y-axis; and $M_4$ represents, after interference occurs between the first test flat and the second test flat, an optical path difference between the first test flat, after being rotated clockwise by 45°+Δθ3 degrees;

Step S5: rotating the first test flat counterclockwise from its position in Step S4 to its original position;

removing the second test flat mirror from the first holder and placing a third test flat mirror on the first holder, so that the first test flat opposes the third test flat;

measuring an optical path difference between the first test flat and the third test flat, calculating an angular rotation error Δθ4 of a current position of the first test flat with respect to its original position in Step S1;

calculating $M_5$ as $$M_5 = A\Delta\theta4 + C^x,$$

where $A^{\Delta\theta4}$ represents profile information of the first test flat after being rotated from its position in Step S4 to its original position in Step S1 with the angular rotation error Δθ4, $C^x$ represents profile information of the third test flat after its x-axis being reversed about the y-axis; and $M_5$ represents, after interference occurs between the first test flat and the third test flat, an optical path difference between the first test flat, after being rotated to its original position in Step S1 with the angular rotation error Δθ4;

Step S6: removing the first test flat mirror from the second holder, and placing the second test flat mirror on the second holder, so that the second test flat opposes the third test flat;

measuring an optical path difference $M_6$ between the second test flat and the third test flat as $$M_6 = \underline{B} + C^x,$$

where $\underline{B}$ represents the profile information of the second test flat, $C^x$ represents the profile information of the third test flat after its x-axis being reversed about the y-axis; and $M_6$ represents, after interference occurs between the second test flat and the third test flat, an optical path difference between the second test flat and the third test flat;

Step S7: removing the third test flat mirror from the first holder, and placing the first test flat mirror on the first holder;

placing a planar imaging unit between the first holder and the second holder, so that adjacent surfaces of the first test flat on the first holder and the planar imaging unit are kept to be parallel, and adjacent surfaces of the planar imaging unit and the second test flat on the second holder are kept to be parallel;

measuring an optical path difference between the first test flat and the second test flat;

calculating an angular rotation error Δθ5 of current positions of the first test flat with respect to its original position in Step S1;

calculating $M_7$ as $$M_7 = A^{\Delta\theta5} + B,$$

where $A^{\Delta\theta5}$ represents profile information of the first test flat with its current position having an angular rotation error Δθ5 with respect to its original position in Step S1, $\underline{B}$ represents the profile information of the second test flat; and $M_7$ represents an optical path difference between the first test flat with its current position having an angular rotation error Δθ5 with respect to its original position and the second test flat;

Step S8: based on the recorded optical path differences $M_1$, $M_2$, $M_3$, $M_4$, $M_5$, $M_6$ and $M_7$, and the recorded rotation errors Δθ1, Δθ2, Δθ3, Δθ4 and Δθ5, calculating, with the computer, the profile information $\underline{A}$ of the first test flat, the profile information $\underline{B}$ of the second test flat, and the profile information $\underline{C}$ of the third test flat.

2. The method of claim 1, wherein the profile information $\underline{A}$ of the first test flat, the profile information $\underline{B}$ of the second test flat, and the profile information $\underline{C}$ of the third test flat are represented by:

$$A = A_{ee} + A_{oe} + A_{eo} + A_{oo,2odd\theta} + A_{oo,4odd\theta},$$

$$B = B_{ee} + B_{oe} + B_{eo} + B_{oo,2odd\theta} + B_{oo,4odd\theta},$$

$$C = C_{ee} + C_{oe} + C_{eo} + C_{oo,2odd\theta} + C_{oo,4odd\theta},$$

where $A_{ee}$ is an even-even component of the first test flat, $A_{oe}$ is an odd-even component of the first test flat, $A_{eo}$ is an even-odd component of the first test flat, $A_{oo,2odd\theta}$ is a part with a base frequency of 2 in an odd-odd component of the first test flat, and $A_{oo,4odd\theta}$ is a part with a base frequency of 4 in the odd-odd component of the first test flat; $B_{ee}$ is an even-even component of the second test flat, $B_{oe}$ is an odd-even component of the second test flat, $B_{eo}$ is an even-odd component of the second test flat, $B_{oo,2odd\theta}$ is a part with a base frequency of 2 in an odd-odd component of the second test flat, and $B_{oo,4odd\theta}$ is a part with a base frequency of 4 in an odd-odd component of the second test flat; $C_{ee}$ is an even-even component of the third test flat, $C_{oe}$ is an odd-even component of the third test flat, $C_{eo}$ is an even-odd component of the third test flat, $C_{oo,2odd\theta}$ is a part with a base frequency of 2 in an odd-odd component of the third test flat, and $C_{oo,4odd\theta}$ is a part with a base frequency of 4 in an odd-odd component of the third test flat.

3. The method of claim 1, further comprising based on the angular measurement errors $\Delta\theta 1$, $\Delta\theta 2$, $\Delta\theta 3$, $\Delta\theta 4$ and $\Delta\theta 5$ calculating optical path information as below:

$$A \approx \frac{A + A^{\Delta\theta 5 - \Delta\theta 4}}{2} = \frac{(M_5 - M_6 + M_7)^{-\Delta\theta 4}}{2},$$

$$B^x = M_1 - A = M_1 - \frac{(M_5 - M_6 + M_7)^{-\Delta\theta 4}}{2},$$

$$A^{180°+\Delta\theta 1} = M_2 - B^x = M_2 - M_1 + \frac{(M_5 - M_6 + M_7)^{-\Delta\theta 4}}{2},$$

$$A^{180°} = (M_2 - M_1)^{-\Delta\theta 1} + \frac{(M_5 - M_6 + M_7)^{-\Delta\theta 4 - \Delta\theta 1}}{2},$$

$$M_1 = A + B^x,$$

$$M_2' = A^{180°} + B^x = (M_2 - M_1)^{-\Delta\theta 1} + \frac{(M_5 - M_6 + M_7)^{-\Delta\theta 4 - \Delta\theta 1}}{2} + M_1 - \frac{(M_5 - M_6 + M_7)^{-\Delta\theta 4}}{2},$$

$$M_3' = A^{90°} + B^x = (M_3 - M_1)^{-\Delta\theta 2} + \frac{(M_5 - M_6 + M_7)^{-\Delta\theta 4 - \Delta\theta 2}}{2} + M_1 - \frac{(M_5 - M_6 + M_7)^{-\Delta\theta 4}}{2},$$

$$M_4' = A^{45°} + B^x = (M_4 - M_1)^{-\Delta\theta 3} + \frac{(M_5 - M_6 + M_7)^{-\Delta\theta 4 - \Delta\theta 3}}{2} + M_1 - \frac{(M_5 - M_6 + M_7)^{-\Delta\theta 4}}{2},$$

$$M_5' = \frac{M_5 - M_6 + M_7}{2} + \frac{M_5 - 3(M_7 - M_6)}{4} + \frac{(M_5 - M_6 + M_7)^{\Delta\theta 5 - \Delta\theta 4}}{4},$$

$$M_6 = B + C^x,$$

where $M_1$, $M_2$, $M_3$, $M_4$, $M_5$, $M_6$ and $M_7$ are optical path difference information; $M_2'$, $M_3'$, $M_4'$, and $M_5'$ are results obtained after angular error modification; and $B'$ represents the profile information after the x-axis of the second test flat is reversed about the y-axis.

4. The method of claim 3, wherein:
the profile information $\underline{A}$ of the first test flat, the profile information $\underline{B}$ of the second test flat, and the profile information $\underline{C}$ of the third test flat are calculated based on the results $M_2'$, $M_3'$, $M_4'$, and $M_5'$ obtained after the angular error modification as below:

$$A_{oe} + A_{eo} = (M_1 - M_2')/2,$$

$$B_{oe} + B_{eo} = \{[M_1 - (M_1)^{180°}]/2 - (A_{oe} + A_{eo})\}^x,$$

$$C_{oe} + C_{eo} = \{[M_5' - (M_5')^{180°}]/2 - (A_{oe} + A_{eo})\}^x,$$

$$A_{ee} = \{[M_1 + (M_1)^{180°}]/2 + [M_5' + (M_5')^{180°}]/2 - [M_6 + (M_6)^{180°}]/2 + ([M_1 + (M_1)^{180°}]/2 + [M_5' + (M_5')^{180°}]/2 - [M_6 + (M_6)^{180°}]/2)^x\}/4,$$

$$B_{ee} = \{[M_1 + (M_1)^{180°}]/2 + [M_1 + (M_1)^{180°}]^x/2 - 2A_{ee}\}/2,$$

$$C_{ee} = \{[M_5' + (M_5')^{180°}]/2 + [M_5' + (M_5')^{180°}]^x/2 - 2A_{ee}\}/2,$$

$$A_{oo,2odd\theta} = [M_1 - (A_{oe} + A_{eo} + A_{ee}) - M_3' + (A_{oe} + A_{eo} + A_{ee})^{90°}]/2,$$

$$B_{oo,2odd\theta} = \{[M_1 - (A_{oe} + A_{eo} + A_{ee}) - (B_{oe} + B_{eo} + B_{ee})^x]^{90°} - M_3' + (A_{oe} + A_{eo} + A_{ee}) + (B_{oe} + B_{eo} + B_{ee})^x\}/2,$$

$$C_{oo,2odd\theta} = \{[M_6 - (B_{oe} + B_{eo} + B_{ee}) - (C_{oe} + C_{eo} + C_{ee})]^{90°} - M_6 + (B_{oe} + B_{eo} + B_{ee}) + (C_{oe} + C_{eo} + C_{ee}) + 2B_{oo2,odd\theta}\}/2,$$

$$A_{oo,4odd\theta} = [M_1 - (A_{oe} + A_{eo} + A_{ee} + A_{oo,2odd\theta}) - M_4' + (A_{oe} + A_{eo} + A_{ee} + A_{oo,2odd\theta})^{45°}]/2$$

$$B_{oo,4odd\theta} = \left\{\begin{array}{l}[M_1 - (A_{oe} + A_{eo} + A_{ee} + A_{oo,2odd\theta}) - \\ (B_{oe} + B_{eo} + B_{ee} + B_{oo,2odd\theta})^x]^{45°} - \\ M_4' + (A_{oe} + A_{eo} + A_{ee} + A_{oo,2odd\theta})^{45°} + \\ (B_{oe} + B_{eo} + B_{ee} + B_{oo,2odd\theta})^x\end{array}\right\}/2,$$

$$C_{oo,4odd\theta} = \left\{\begin{array}{l}[M_6 - (B_{oe} + B_{eo} + B_{ee} + B_{oo,2odd\theta}) - \\ (C_{oe} + C_{eo} + C_{ee} + C_{oo,2odd\theta})^x]^{45°} - \\ M_6 + (B_{oe} + B_{eo} + B_{ee} + B_{oo,2odd\theta}) + \\ (C_{oe} + C_{eo} + C_{ee} + C_{oo,2odd\theta})^x\end{array}\right\}/2,$$

based on the above results, calculating as follows:

$$A = A_{ee} + A_{oe} + A_{eo} + A_{oo,2odd\theta} + A_{oo,4odd\theta},$$

$$B = B_{ee} + B_{oe} + B_{eo} + B_{oo,2odd\theta} + B_{oo,4odd\theta},$$

$$C = C_{ee} + C_{oe} + C_{eo} + C_{oo,2odd\theta} + C_{oo,4odd\theta},$$

where $A_{ee}$ is an even-even component of the first test flat, $A_{oe}$ is an odd-even component of the first test flat, $A_{eo}$ is an even-odd component of the first test flat, $A_{oo,2odd\theta}$ is a part with a base frequency of 2 in an odd-odd component of the first test flat, and $A_{oo,4odd\theta}$ is a part with a base frequency of 4 in the odd-odd component of the first test flat;

$B_{ee}$ is an even-even component of the second test flat, $B_{oe}$ is an odd-even component of the second test flat, $B_{eo}$ is an even-odd component of the second test flat, $B_{oo,2odd\theta}$ is a part with a base frequency of 2 in an odd-odd component of the second test flat, and $B_{oo,4odd\theta}$ is a part with a base frequency of 4 in an odd-odd component of the second $C_{eo}$ is an even-even component of the third test flat, $C_{oe}$ is an odd-even component of the third test flat, $C_{eo}$ is an even-odd component of the third test flat, $C_{oo,2odd\theta}$ is a part with a base frequency of 2 in an odd-odd component of the third test flat, and $C_{oo,4odd\theta}$ is a part with a base frequency of 4 in an odd-odd component of the third test flat;

$M_1$, $M_2$, $M_3$, $M_4$, $M_5$, $M_6$ and $M_7$ are optical path difference information; $M_2'$, $M_3'$, $M_4'$, and $M_5'$ are results obtained after angular error modification; and $B^x$ represents the profile information after the x-axis of the test flat is reversed about the y-axis;

for a function F(x,y), two operators $[\ ]^x$ and $[\ ]^\theta$ are defined, where one is a reverse operator: $[F(x,y)]^x=F(-x,y)$, the other is a rotation operator:

$[F(x,y)]^\theta = F(x\cos\theta - y\sin\theta, x\sin\theta + y\sin\theta)$, thereof, $[F(x,y)]^{180°} = F(-x,-y)$, and thus $F(x,y)+G(-x,y)=F(x,y)+[G(x,y)]^x$, by applying the two operators to the equations:

$[F(x,y)]^{180°} = F_{ee}+F_{oo}-F_{oe}-F_{eo}$, $[F(x,y)]^x = F_{ee}-F_{oo}-F_{oe}+F_{eo}$, the definition of F function is applicable to the first test plat, the second test plat, the third test plate, or a combination thereof, or a combination of frequency components thereof, or optical path differences, the definition to the operation of the function F is applicable to the first test flat, the second test flat, the third test flat, or a combination thereof, or a combination of frequency components thereof, or a combination of optical path difference information $M_1$, $M_2$, $M_3$, $M_4$, $M_5$, $M_6$ and $M_7$, or a combination of optical path difference information $M_2'$, $M_3'$, $M_4'$ and $M_5'$ obtained after angular error modification.

* * * * *